E. VALENTINE.
NUT LOCK.
APPLICATION FILED APR. 16, 1913.
1,075,521.
Patented Oct. 14, 1913.
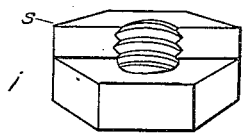
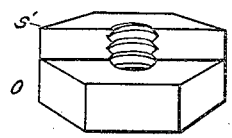
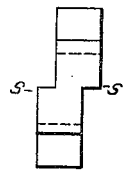
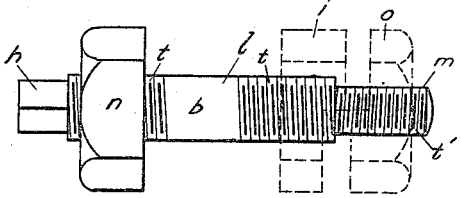
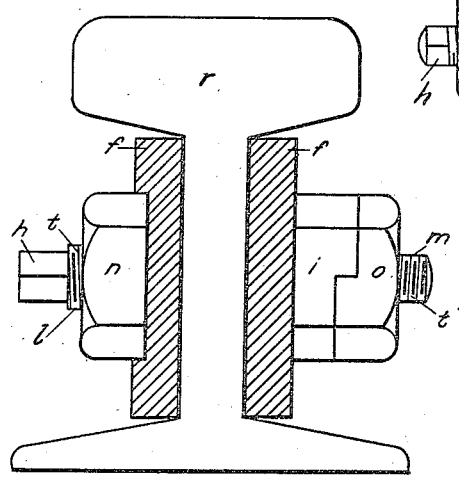
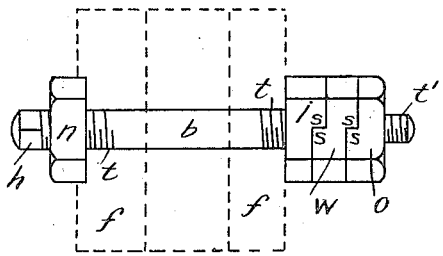
WITNESSES:
Walter Turner
Geo. N. Moore
INVENTOR.
Elmer Valentine
BY John P. Turner
ATTORNEY.

UNITED STATES PATENT OFFICE.

ELMER VALENTINE, OF BYESVILLE, OHIO.

NUT-LOCK.

1,075,521.

Specification of Letters Patent. Patented Oct. 14, 1913.

Application filed April 16, 1913. Serial No. 761,531.

*To all whom it may concern:*

Be it known that I, ELMER VALENTINE, a citizen of the United States, residing at Byesville, in the county of Guernsey and State of Ohio, have invented a new and useful Nut-Lock, of which the following is a specification.

My invention relates to improvements in nut locks; and the objects of my improvement are, first, to provide a nut lock that will not relax its hold under jar or strain; second, to provide a nut lock, whose symmetry in form is not marred by unsightly keys, springs, and other appendages, as is required by nut locks now in use; and, third, to afford a nut lock that is simple in construction and therefore inexpensive in its manufacture. I attain these objects by the mechanism illustrated in the following drawing which represents one of the many uses to which my invention may be applied.

Figure 1, is a view in perspective of the inner nut of the lock; Fig. 2, a view in perspective of the outer nut; Fig. 3, a view of a specially formed washer, to be used when necessary; Fig. 4, a view of the bolt with the three nuts in their respective positions on the bolt; and, Fig. 5, a detailed view of the several parts adjusted to, and securing a rail joint; and Fig. 6, a detailed view of bolt $b$, and the three nuts in their relative positions and the specially formed washer, $w$, on the bolt $b$, between the nuts, $i$, and $o''$.

Similar letters refer to similar parts throughout the several views; and in order to simplify the description, I will refer to Fig. 1, by using the letter $i$, and to Fig. 2, by the letter $o$.

The bolt $b$, is formed with larger part $l$, and smaller part $m$, on which are cut three sets of threads, $t$, $t$, and $t'$. The threads $t$, $t$, are right hand threads, while the thread $t'$ is a left hand thread. The nuts $i$, and $o$, are constructed with the shoulders $s$, $s'$, and other parts equal in dimensions, except that the hole and thread in the nut $i$, corresponds with the size and thread of the larger part of the bolt $b$, and the hole and thread in the nut $o$, corresponds with the size and thread of the smaller part of the bolt $b$, this thread being a left hand thread.

The nut $n$, on the larger end of the bolt $b$, serves the purpose of a head for the bolt $b$, and is prevented from turning by countersinking into the fish plate $f$.

After placing the nut $n$, on the larger end of the bolt $b$, the bolt $b$, is inserted through the holes in the fish plates $f$, $f$, and the rail $r$, and the inner nut $i$, is then screwed on the bolt $b$, until it comes in contact with the fish plate $f$, which it holds firmly to the rail $r$, and the outer nut $o$, is screwed on the smaller part of the bolt $b$, until it reaches the position on the bolt $b$, as indicated by the nut $o$, in Fig. 4; and by turning the bolt $b$, to the left by grasping it with a wrench at the square end $h$, the nuts $i$, and $o$, will be drawn together, and become firmly locked by means of the shoulders $s$, $s'$, as shown in Fig. 5. The nuts $n$, and $i$, will not change their relative positions by turning the bolt $b$, and will not in the least degree relax their tension on the fish plates $f$, $f$, by turning the bolt $b$, in either direction.

In other uses of my invention, than that described in this specification the bolt $b$, may require a washer to be used between the nuts $i$, and $o$. For such a contingency, I have provided a washer with shoulders $s$, $s$, on either side for placing between the nuts $i$, and $o$, when required by the length of the bolt.

What I claim as new and desire to secure by Letters Patent, is—

A headless bolt comprising larger and smaller parts, one square end, and three sets of threads, two sets being right hand threads and one set a left hand thread, on which are held three nuts with threads to correspond with the three threads on the bolt, respectively the two adjacent nuts on the right and left threads being formed with interlocking shoulders, which are drawn together and locked by means of said right and left hand threads when the bolt is turned in the proper direction, substantially as described and shown.

ELMER VALENTINE.

Witnesses:
J. K. YOUNG,
WALTER TURNER.